US010332018B2

(12) United States Patent
Cocchiara et al.

(10) Patent No.: US 10,332,018 B2
(45) Date of Patent: Jun. 25, 2019

(54) SERVICE LEVEL AGREEMENT RISK ANALYSIS WITH EXOGENOUS ARCHITECTURE

(71) Applicant: International Business Machines Corporation, Armonk, NY (US)

(72) Inventors: Richard M. Cocchiara, Washingtonville, NY (US); John V. Delaney, Meath (IE); Anthony M. Hunt, Hopewell Junction, NY (US); Maeve M. O'Reilly, Wicklow (IE); Clea A. Zolotow, Key West, FL (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 15/057,207

(22) Filed: Mar. 1, 2016

(65) Prior Publication Data

US 2017/0257389 A1    Sep. 7, 2017

(51) Int. Cl.
*G06N 7/00*    (2006.01)
*H04L 12/24*    (2006.01)

(52) U.S. Cl.
CPC ........... *G06N 7/005* (2013.01); *H04L 41/145* (2013.01); *H04L 41/5003* (2013.01)

(58) Field of Classification Search
CPC .. G06F 11/008; G06F 11/1484; G06F 11/202; G06F 17/30091; G06F 17/5009;
(Continued)

(56) References Cited

U.S. PATENT DOCUMENTS

2007/0194097 A1\* 8/2007 Jones ................... B25J 19/06
235/375
2008/0262981 A1\* 10/2008 Supatgiat ............ G06F 17/5009
705/500
(Continued)

FOREIGN PATENT DOCUMENTS

AU    2011218627 A1    3/2012
JP    2008519322 A    6/2008

OTHER PUBLICATIONS

Disclosed Anonymously; "System and method for in-memory high availability/disaster recovery solution"; IP.com Prior Art Database Technical Disclosure; IP.com No. 000228771; pp. 6; Printed Dec. 29, 2015; <http://ip.com/IPCOM/000228771>.
(Continued)

*Primary Examiner* — Joseph P Hirl
*Assistant Examiner* — Sayed Aresh Beheshti Shirazi
(74) *Attorney, Agent, or Firm* — Edward J. Wixted, III; Christopher M. Pignato

(57) ABSTRACT

A set of internal information technology (IT) architecture is received and the internal IT architecture is controlled by a service provider. A set of exogenous IT architecture is received and the exogenous IT architecture is not controlled by the service provider. A set of service level agreement (SLA) requirements, agreed upon by the service provider and a service user, are received. A set of sensor data, from sensors monitoring environmental conditions which may affect at least one of the internal IT architecture or the exogenous IT architecture, is received. A set of heuristic data relating to the internal IT architecture and the exogenous IT architecture is received. A risk metric based on the set of internal IT architecture, the set of exogenous IT architecture, the set of SLA requirements, the set of sensor data, and the set of heuristic data is determined.

14 Claims, 5 Drawing Sheets

(58) Field of Classification Search
CPC ............. G06F 21/6218; G06F 2217/10; G06F 9/5061; H04L 41/0213; H04L 41/069; H04L 41/5003; H04L 67/10; H04L 67/322; H04L 67/42

See application file for complete search history.

(56) References Cited

U.S. PATENT DOCUMENTS

| | | | |
|---|---|---|---|
| 2009/0210427 A1* | 8/2009 | Eidler | G06F 11/1484 |
| 2009/0216910 A1* | 8/2009 | Duchesneau | G06F 9/5072 |
| | | | 709/250 |
| 2012/0232948 A1* | 9/2012 | Wolf | G06Q 10/0635 |
| | | | 705/7.28 |
| 2013/0060933 A1 | 3/2013 | Tung et al. | |
| 2014/0129000 A1* | 5/2014 | Block | G05B 9/02 |
| | | | 700/79 |
| 2014/0181572 A1* | 6/2014 | Bradfield | G06F 11/20 |
| | | | 714/4.11 |
| 2014/0201362 A1* | 7/2014 | Radhakrishnan | G06F 9/5061 |
| | | | 709/224 |
| 2014/0317681 A1* | 10/2014 | Shende | H04L 63/10 |
| | | | 726/1 |
| 2014/0358624 A1* | 12/2014 | Chodavarapu | G06Q 10/06 |
| | | | 705/7.26 |
| 2014/0379833 A1* | 12/2014 | Nunami | H04L 67/1097 |
| | | | 709/212 |
| 2015/0095102 A1 | 4/2015 | Hanley et al. | |
| 2015/0302311 A1* | 10/2015 | Iskandar | G06N 5/048 |
| | | | 706/11 |
| 2016/0232193 A1* | 8/2016 | Bahrs | H04L 41/5019 |
| 2017/0116091 A1* | 4/2017 | Anderson | H04L 43/16 |
| 2017/0230402 A1* | 8/2017 | Greenspan | H04L 63/1433 |

OTHER PUBLICATIONS

Mahajan, Sameer et al.; "Service Level Agreement Driven Disaster Recovery"; IP.com Prior Art Database Technical Disclosure; IP.com No. 000227394; pp. 4; Printed Dec. 29, 2015; <http://ip.com/IPCOM/000227394>.

Mell et al., "The NIST Definition of Cloud Computing", Recommendations of the National Institute of Standards and Technology, NIST Special Publication 800-145, Sep. 2011, 7 Pages.

Rajaa, Subash; "System and Method for mitigating SLA risks due to application mobility between datacenters"; IP.com Prior Art Database Technical Disclosure; IP.com No. 000226577; pp. 4; Printed Dec. 29, 2015; <htttp://ip.com/IPCOM/000226577>.

Cocchiara et al., "Service Level Agreement Risk Analysis With Exogenous Architecture", U.S. Appl. No. 15/699,063, filed Sep. 8, 2017, 24 pages.

Appendix P, "List of IBM Patents or Patent Applications Treated as Related", dated Sep. 7, 2017, 2 Pages.

* cited by examiner

SERVICE LEVEL AGREEMENT RISK ANALYSIS WITH EXOGENOUS ARCHITECTURE

BACKGROUND OF THE INVENTION

The present invention relates generally to the field of service level agreements, and more particularly to the risk analysis of a service level agreement operating with exogenous architecture.

A service level agreement (SLA) is a part of a standardized service contract where a service is formally defined. Particular aspects of the service—scope, quality, responsibilities—are agreed between the service provider and the service user. A common feature of an SLA is a contracted delivery time (of the service or performance). As an example, Internet service providers and telecommunication companies will commonly include service level agreements within the terms of their contracts with customers to define the level(s) of service being sold in plain language terms. In this case, the SLA will typically have a technical definition in terms of mean time between failures (MTBF), mean time to repair, mean time to recovery (MTTR), or a percentage of transactions executed within a pre-defined time frame.

SUMMARY

Embodiments of the present invention include a method, computer program product, and system for analyzing the risk of a service level agreement operating with exogenous architecture. In one embodiment, a set of internal information technology (IT) architecture is received and the internal IT architecture is controlled by a service provider. A set of exogenous IT architecture is received and the exogenous IT architecture is not controlled by the service provider. A set of service level agreement (SLA) requirements, agreed upon by the service provider and a service user, are received. A set of sensor data, from sensors monitoring environmental conditions which may affect at least one of the internal IT architecture or the exogenous IT architecture, is received. A set of heuristic data relating to the internal IT architecture and the exogenous IT architecture is received. A risk metric based on the set of internal IT architecture, the set of exogenous IT architecture, the set of SLA requirements, the set of sensor data, and the set of heuristic data is determined.

DETAILED DESCRIPTION

Figure 1:
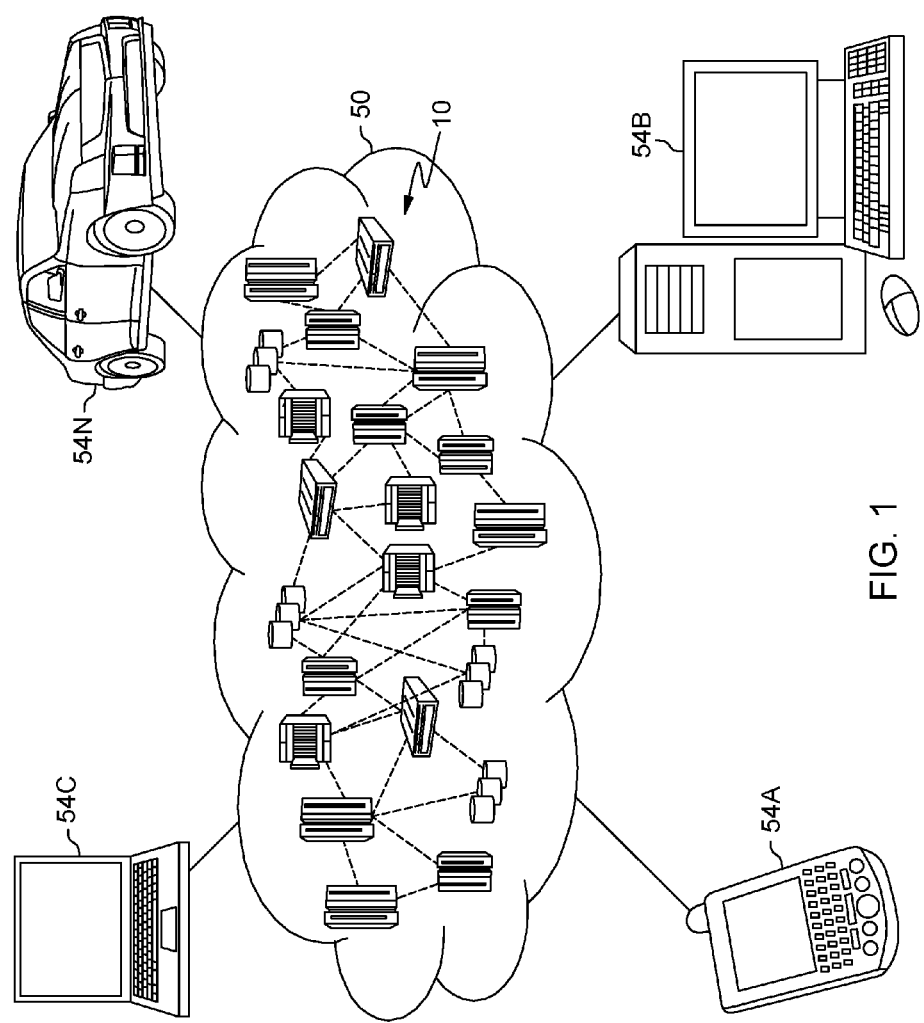
FIG. 1 depicts a cloud computing environment according to an embodiment of the present invention.

Some embodiments of the present invention recognize that executing a service level agreement (SLA) is dependent on the information technology (IT) architecture supporting the workload. The optimal scenario is when the service provider owns and controls the IT architecture. In this example, the architecture may be considered endogenous (i.e., controlled internally by the service provider). In some scenarios, some, or all, of the architecture may be exogenous (i.e., external hardware not controlled by the service provider). The use of exogenous architecture may make fulfilling the SLA more problematic.

Embodiments of the present invention recognize that there may be a method, computer program product, and computer system for analyzing the risk of a service level agreement operating with exogenous architecture. The method, computer program product, and computer system may use inputs such as the terms of the SLA, the IT architecture, any available heuristic data, and any available sensor data to perform a risk analysis for meeting the terms of the SLA and provide a proactive response to potential issues with the IT architecture.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
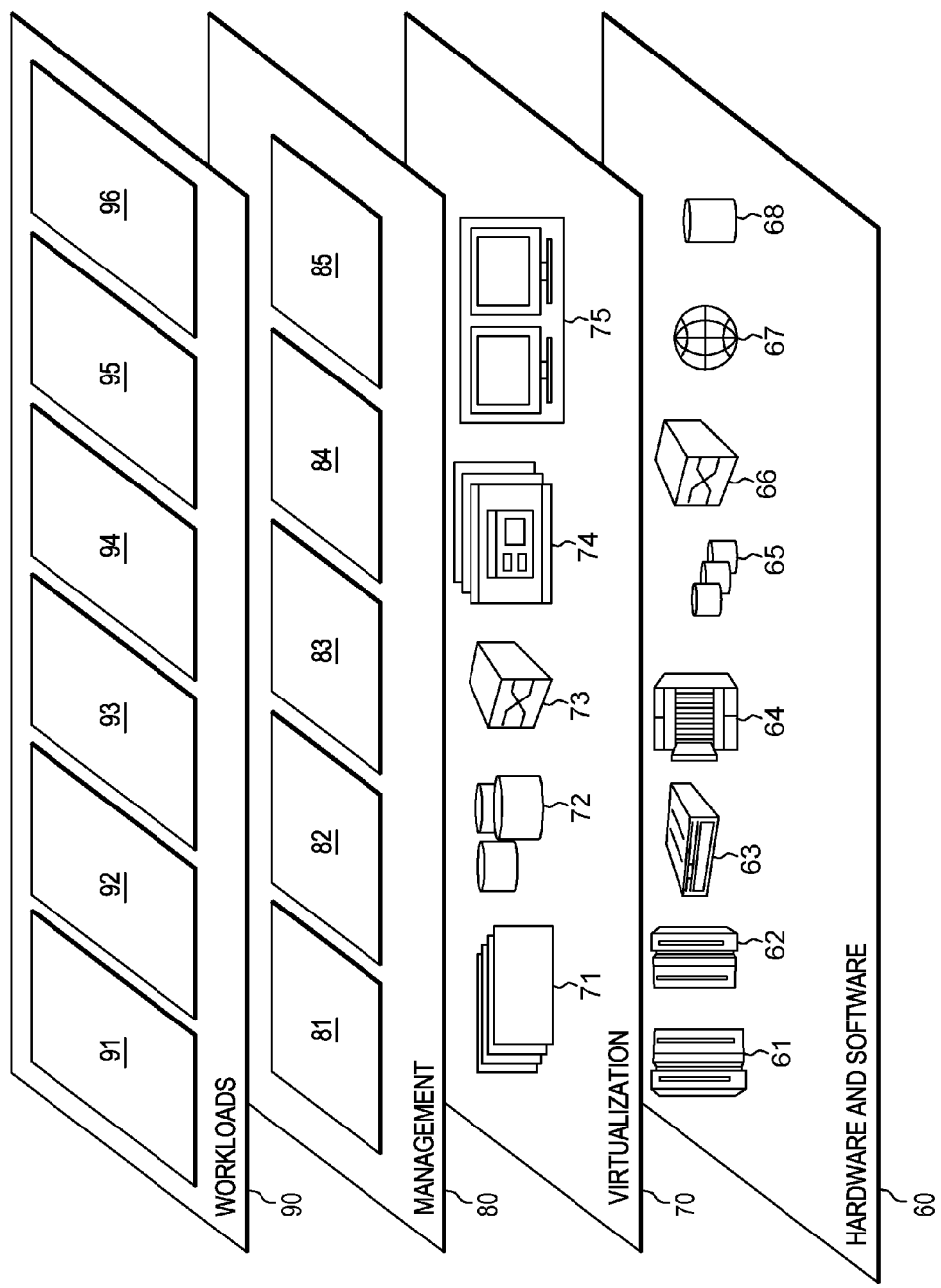
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and risk orchestrator 96.

Figure 3:
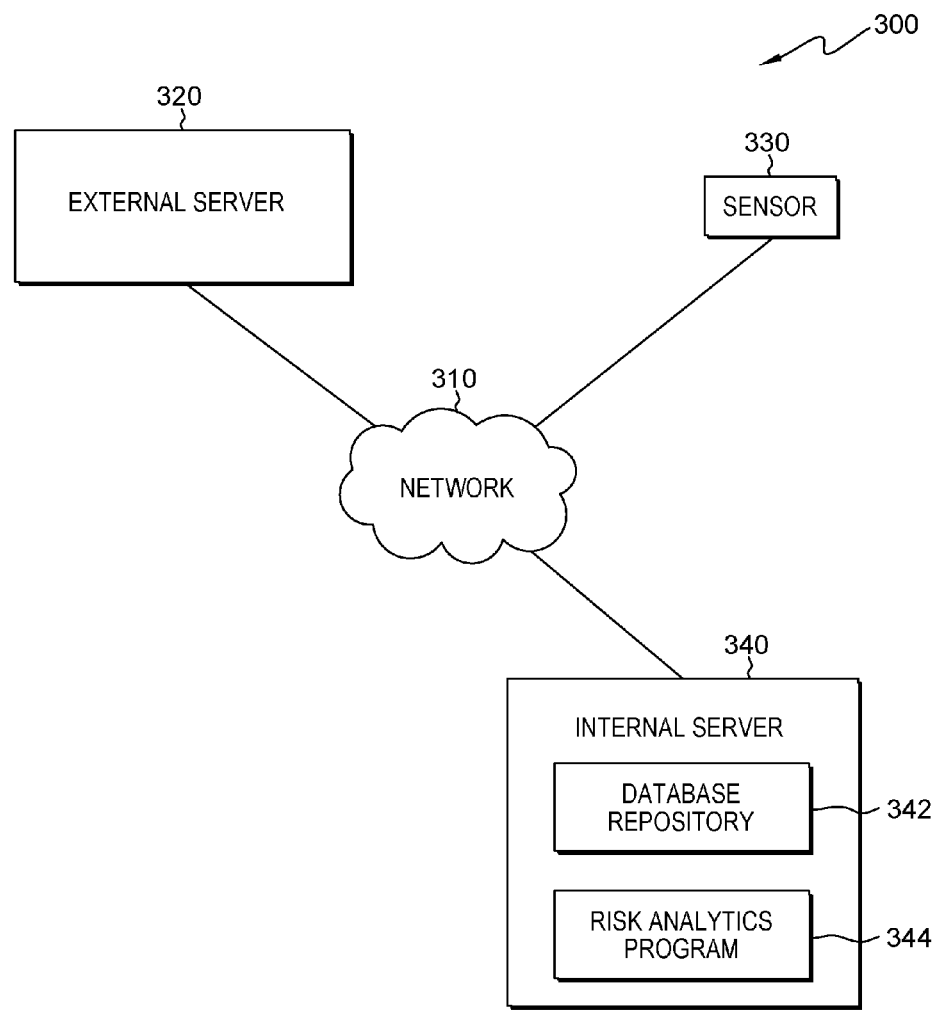
FIG. 3 is a functional block diagram of a computing environment, in accordance with an embodiment of the present invention.

FIG. 3 is a functional block diagram of a computing environment, generally designated 300, in accordance with an embodiment of the present invention. FIG. 3 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 300 includes external server 320, sensor 330, and internal server 340. Internal server 340 includes database repository 342 and risk analytics program 344. External server 320, sensor 330, and internal server 340 are interconnected via network 310. In example embodiments, computing environment 300 may include other computing devices not shown such as smartwatches, cell phones, smartphones, phablets, tablet computers, laptop computers, desktop computers, other computer servers or any other computer system known in the art, interconnected with external server 320, sensor 330, and internal server 340 over network 310.

In example embodiments, external server 320, sensor 330, and internal server 340 may connect to network 310 which enables external server 320 and internal server 340 to access sensor 330 and other computing devices and/or data not directly stored on external server 320 or internal server 340. Network 310 may be a local area network (LAN), a telecommunications network, a wide area network (WAN) such as the Internet, or any combination of the three, and include wired, wireless or fiber optic connections. Network 310 may include one or more wired and/or wireless networks that are capable of receiving and transmitting data, voice, and/or video signals, including multimedia signals that include voice, data, and video information. In general, network 310 may be any combination of connections and protocols that will support communications between external server 320, sensor 330, internal server 340, and other computing devices (not shown) within computing environment 300, in accordance with embodiments of the present invention.

In embodiments of the present invention, external server 320 may be a laptop, tablet, or netbook personal computer (PC), a desktop computer, a personal digital assistant (PDA), a smartphone, or any other hand-held, programmable electronic device capable of communicating with any computing device within computing environment 300. In certain embodiments, external server 320 represents a computer system utilizing clustered computers and components (e.g., database server computers, application server computers, etc.) that act as a single pool of seamless resources when accessed by elements of computing environment 300. In general, external server 320 is representative of any electronic device or combination of electronic devices capable of executing computer readable program instructions. Internal server 340 is substantially similar to external server 320. Computing environment 300 may include any number of external server 320. External server 320 and internal server 340 may include components as depicted and described in further detail with respect to FIG. 5, in accordance with embodiments of the present invention. In an embodiment, external server 320 and internal server 340 represent information technology architecture required to support service level agreements.

In an embodiment, sensor 330 is a device capable of detecting events or changes in its environment, and providing a corresponding output. Sensor 330 may be a type of transducer and may provide various types of output (e.g., electrical or optical signals). In an embodiment, sensor 330 is a sensor which monitors environmental conditions and may include one or more of the following: a passive infrared (PIR) motion sensor, a pressure sensor, a humidity sensor, a moisture sensor, an ultrasonic sensor, a temperature sensor, a gas sensor, an acceleration sensor, a displacement sensor, a noise sensor, etc. In general, sensor 330 is any device capable of detecting an event and providing an output. According to embodiments of the present invention, there may be any number of sensor 330 in computing environment 300.

In an embodiment, database repository 342 may be storage that may be written to and/or read by external server 320 and internal server 340. In one embodiment, database repository 342 resides on internal server 340. In other embodiments, database repository 342 may reside on external server 320 or any other device (not shown) in computing environment 300, in cloud storage or on another computing device accessible via network 310. In yet another embodiment, database repository 342 may represent multiple storage devices within internal server 340. Database repository 342 may be implemented using any volatile or non-volatile storage media for storing information, as known in the art. For example, database repository 342 may be implemented with a tape library, optical library, one or more independent hard disk drives, multiple hard disk drives in a redundant array of independent disks (RAID), solid-state drives (SSD), or random-access memory (RAM). Similarly, database repository 342 may be implemented with any suitable storage architecture known in the art, such as a relational database, an object-oriented database, or one or more tables. In an embodiment of the present invention, the applications (not shown) operating on internal server 340 may store data to database repository 342. Examples of data stored to database repository 342 include documents (e.g., service level agreements), heuristic data (e.g., query response time, first call resolution time, turn-around time, mean time to recover, a mean time to failure, etc.), sensor data (e.g., precipitation data (i.e., type, amount, etc.), temperature data, humidity data, wind speed data, motion data, atmospheric pressure data, noise data, seismic data, etc.), and output from risk analytics program 344.

In embodiments of the present invention, risk analytics program 344 may be a program, subprogram of a larger program, application, plurality of applications or mobile application software which functions to analyze the risk of a service level agreement operating with exogenous architecture. A program is a sequence of instructions written by a programmer to perform a specific task. Risk analytics program 344 may run by itself but may be dependent on system software (not shown) to execute. In one embodiment, risk analytics program 344 functions as a stand-alone program residing on internal server 340. In another embodiment, risk analytics program 344 may be included as a part of an operating system (not shown) of internal server 340. In yet another embodiment risk analytics program 344 may work in conjunction with other programs, applications, etc., found on internal server 340 or in computing environment 300. In yet another embodiment, risk analytics program 344 may be found on external server 320 or other computing devices (not shown) in computing environment 300 which are interconnected to internal server 340 via network 310. Risk analytics program 344 is substantially similar to risk orchestrator 96 in cloud computing environment 50.

According to embodiments of the present invention, risk analytics program 344 functions to risk analyze a service level agreement operating with exogenous architecture. According to an embodiment of the present invention, risk analytics program 344 utilizes the status of the internal and external architecture, the SLA, heuristic data, and sensor data to perform a risk analysis to determine whether the requirements of an SLA can be met.

Figure 4:
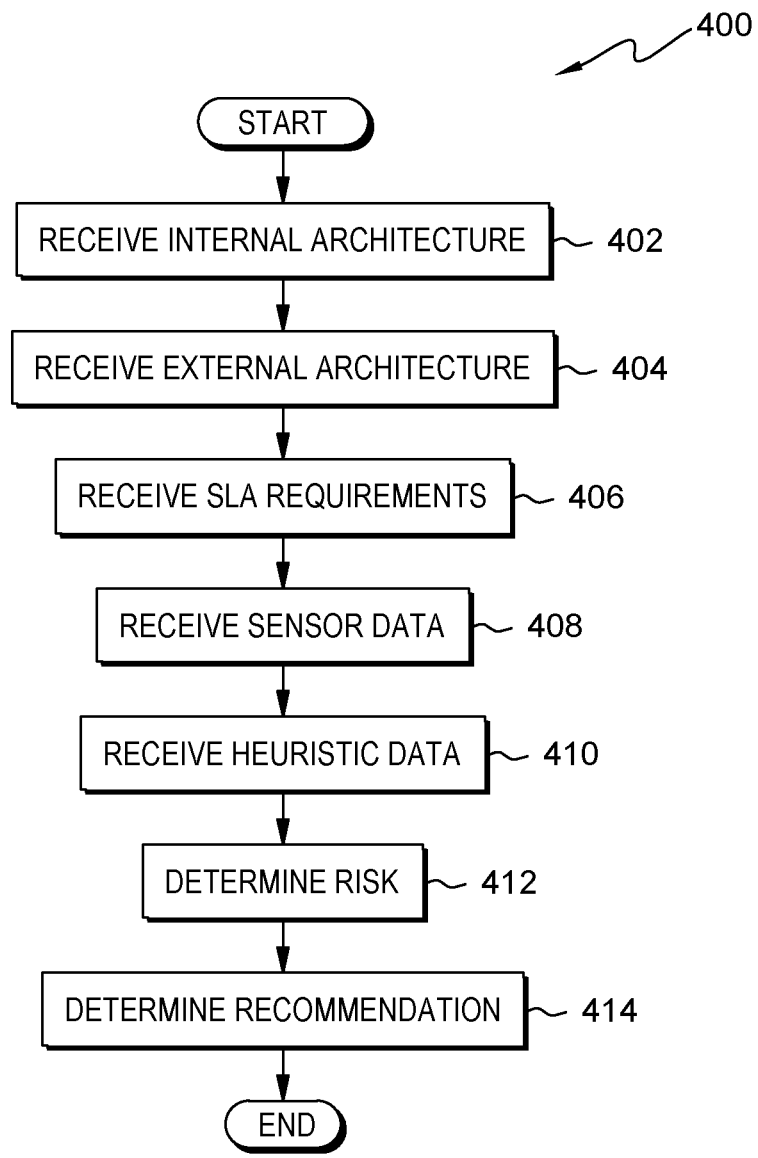
FIG. 4 is a diagram depicting operational steps of a program that functions to analyze the risk of a service level agreement operating with exogenous architecture, in accordance with an embodiment of the present invention.

FIG. 4 is a diagram of flowchart 400 representing operational steps for analyzing the risk of a service level agreement operating with exogenous architecture, in accordance with an embodiment of the present invention. In one embodiment, risk analytics program 344 performs the operational steps of flowchart 400. In an alternative embodiment, any other program, while working with risk analytics program 344, may perform the operational steps of flowchart 400. In an embodiment, risk analytics program 344 may invoke the operational steps of flowchart 400 upon the request of a user. In an alternative embodiment, risk analytics program 344 may invoke the operational steps of flowchart 400 automatically upon the receipt of sensor data, an update to the terms of an SLA, or a change in IT architecture. In an embodiment, any of the operational steps of flowchart 400 may be performed in any order.

In an embodiment, risk analytics program 344 receives internal architecture (step 402). In other words, risk analytics program 344 receives the current IT architecture within computing environment 300, controlled internally by a service provider, which is used by the service provider for meeting the requirements of the SLA between the service provider and the service user (i.e., customer). In an embodiment, the information regarding the IT architecture may include one of more of the following: the brand of the hardware and/or software included in the IT architecture, any known issues with the hardware and/or software, the hardware parameters (e.g., amount of processing capability, amount of memory, etc.), and the like. In an embodiment, internal server 340 is available to the service provider for meeting the terms of an SLA between the service provider and the service user. For example, the service provider may have three symmetric multiprocessor systems, each with ten terabytes of available memory.

In an embodiment, risk analytics program 344 receives external architecture (step 404). In other words, risk analytics program 344 receives current IT architecture within computing environment 300, controlled externally by an IT provider, which is used in conjunction with the internal IT architecture by the service provider for meeting the requirements of the SLA between the service provider and the service user (i.e., customer). In an embodiment, the information regarding the IT architecture may include one of more of the following: the brand of the hardware and/or software included in the IT architecture, any known issues with the hardware and/or software, the hardware parameters (e.g., amount of processing capability, amount of memory, etc.), and the like. In an embodiment, external server 320 is available to the service provider for meeting the terms of an SLA between the service provider and the service user. For example, an external IT provider may have two symmetric multiprocessor systems, each with twenty terabytes of available memory.

In an embodiment, risk analytics program 344 receives SLA requirements (step 406). In other words, risk analytics program 344 receives the terms agreed upon between the service provider and the customer. According to embodiments of the present invention, SLA requirements may include one or more of the following: a scope of work to be performed, a quality level of the scope of work, a list of responsibilities between the service provider and the service user, a contracted delivery time, and the like. In an embodiment, the SLA requirements are stored to database repository 342 on internal server 340. For example, the service provider agrees to a ninety-nine percent up time of the IT architecture, a forty-eight hour mean time to recovery and a first call resolution of eighty-five percent.

In an embodiment, risk analytics program 344 receives sensor data (step 408). In other words, risk analytics program 344 receives the available sensor data which may affect the likelihood of meeting the requirements of the SLA. In an embodiment, sensor 330 sends data to internal server 340 and the data is stored to database repository 342 for use by risk analytics program 344. For example, weather related data (e.g., precipitation data, atmospheric pressure data, wind data, etc.) is sent by various sensors to a database repository.

In an embodiment, risk analytics program 344 receives heuristic data (step 410). In other words, risk analytics program 344 receives the available heuristic data from both the existing internal IT architecture and when available, the existing external IT architecture which are tracked over time and may provide insight as to whether or not an SLA may be met. Risk analytics program 344 also receives the mean time failure for both the existing internal and existing external IT architecture. In an embodiment, available heuristic data is stored to database repository 342 for use by risk analytics program 344. For example, the turn-around time (i.e., the time taken to complete a certain task) and the mean time to recover (i.e., the time taken to recover service from an outage of service) are tracked and the data stored to a database repository.

In an embodiment, risk analytics program 344 determines risk (step 412). In other words, risk analytics program 344 uses the input from step 402, step 404, step 406, step 408, and step 410 to determine the risk (i.e., a metric in percentage) that the requirements of an SLA will not be met at a given point in time. According to an embodiment of the present invention, risk analytics program 344 may determine the risk upon the request of a user of internal server 340. In another embodiment, risk analytics program 344 may determine the risk on a periodic basis (e.g., twice/day, once/day, once/week, or any other time basis defined by a user of internal server 340). In an embodiment, Bayes' Theorem may be used to determine the risk. In another embodiment, the Monte Carlo method may be used to determine the risk. In yet another embodiment, any other risk analytics function known in the art may be used to determine the risk. In an embodiment, risk analytics program 344 receives, from database repository 342, the current internal IT architecture, the current external IT architecture, the SLA requirements, available sensor data, and available heuristic data, and determines a risk analysis for meeting the SLA requirements. For example, based on the age of the known, internal IT architecture and a severe, incoming pattern of weather (i.e., possible flooding), the risk of not meeting the SLA requirements is determined to be twenty-five percent (i.e., there is a twenty-five percent chance that the SLA requirements will not be met or conversely, a seventy-five percent chance that the SLA requirements will be met).

The following is an example risk determination using Bayes' Theorem which may be expressed as $P(A|B) = P(A)*P(B|A)/P(B)$. In this equation, $P(A)$ is the probability or A occurring which is the probability of the internal IT architecture failing. $P(B)$ is the probability of B occurring which is the probability of the external IT architecture failing. The $P(B|A)$ is the probability of B occurring given that A has occurred which is the probability of the external IT architecture failing given that the internal IT architecture has failed. The $P(A|B)$ then is the probability of A given that B has occurred which is the probability that the internal architecture has failed given that the external IT architecture has failed. Assumptions may be made regarding the probability of either the internal or external IT architectures failing based on factors such as the age of the hardware that comprises the architectures, the known reliability of the architectures, the commonality between the architectures, any environmental factors affecting either architecture, etc. For the example, assume that the probability of the internal IT architecture failing is 0.05 (i.e., five percent) while the probability of the external IT architecture failing is 0.10 (i.e., ten percent); this is due to the internal IT architecture being newer than the external IT architecture and that the external IT architecture resides in one hundred year flood zone so it may be affected by severe weather more than the internal IT architecture. Also assume that the probability of the external IT architecture failing given that the internal IT architecture has failed is 0.2 (i.e., twenty percent). This is based on the increased workload on the outdated, external IT architecture which is required due to the failed internal IT architecture. Therefore, the probability of the internal IT architecture failing given that the external IT architecture has failed can be calculated using Bayes' Theorem. The required equation is (0.05)*(0.20)/(0.10) which results in a probability of 0.10 or ten percent.

According to an embodiment of the present invention, using the determined risk of meeting the requirements of an SLA may allow a service provider to offer value pricing to a service user. For example, a service user may demand a system availability of one hundred percent during some peak transaction time. If the determined risk shows that the likelihood of achieving one hundred percent during the peak transaction time is less than the determined risk at other times, a service user may be willing to pay extra to the service provider so that extra resources may be provided to mitigate that risk.

In an embodiment, risk analytics program 344 determines a recommendation (step 414). In other words, risk analytics program 344 determines a recommendation based on the risk determined in step 412. In an embodiment, the recommendation may concern the internal IT architecture. In another embodiment, the recommendation may concern the external IT architecture. In yet another embodiment, the recommendation may concern both the internal and external IT architecture. In an embodiment, risk analytics program 344 determines a recommendation and stores the recommendation to database repository 342. For example, with only a seventy-five percent chance of meeting the requirements of the SLA, a recommendation is made to failover a primary database to a standby database in a different physical location.

In an embodiment, flowchart 400 may be used to progressively provision a disaster recovery system. According to embodiments of the present invention, internal IT architecture may be a primary system and external IT architecture may be a disaster recovery system. The external IT architecture may have a plurality of activation levels which may be based on a service level agreement, heuristic data, and the like. In an embodiment, sensor data may be received and the risk of failure of the internal IT architecture may be determined by a probability database. An appropriate level of activation may be determined based on the determined probability of failure of the internal IT architecture. At the appropriate activation level, the external IT architecture may be activated and the workload of the internal IT architecture may be executed on the external IT architecture.

Figure 5:
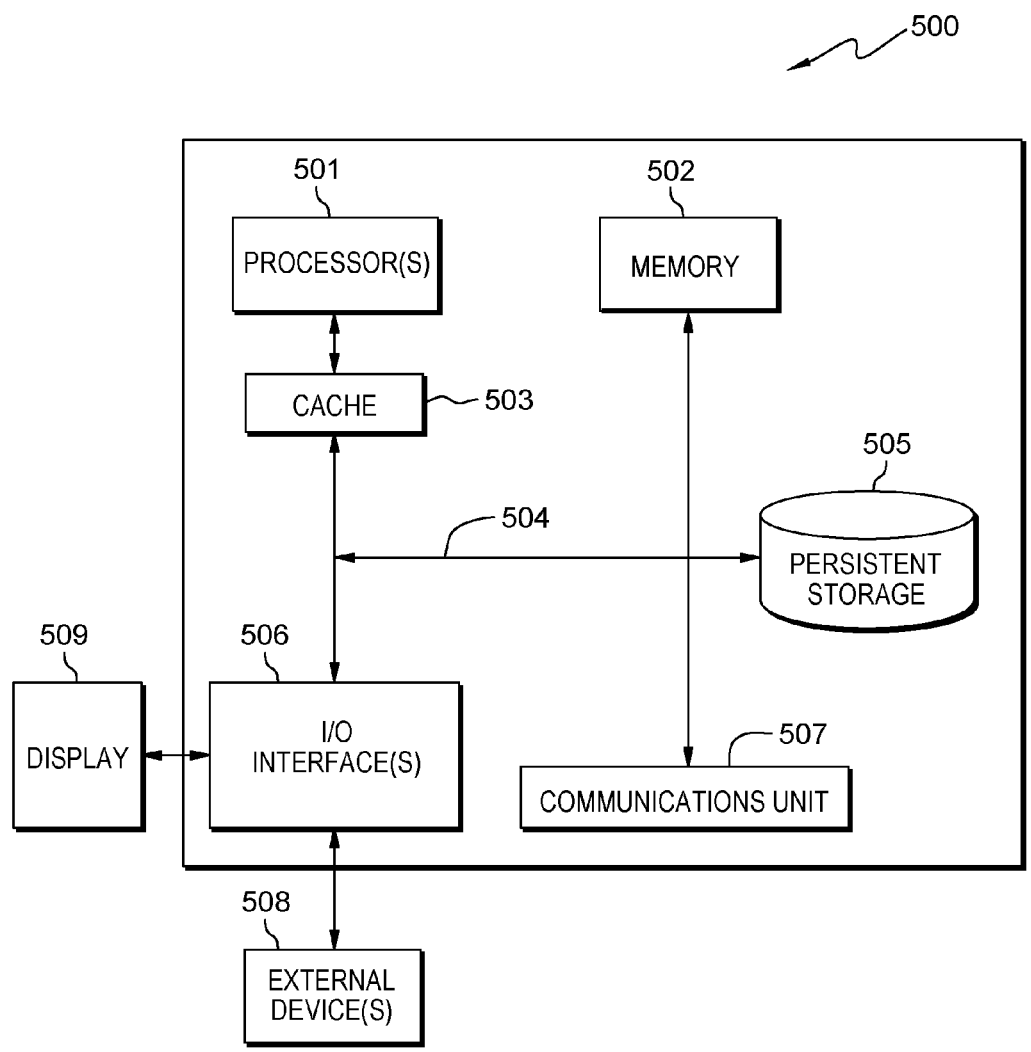
FIG. 5 depicts a block diagram of the components of the computing environment of FIG. 3, in accordance with an embodiment of the present invention.

FIG. 5 depicts computer system 500 which is an example of a system that includes risk analytics program 344. Computer system 500 may be an example of the external server 320 or the internal server 340 of FIG. 1. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for analyzing a risk of a service level agreement operating with exogenous architecture, the method comprising:

receiving, by one or more hardware computer processors, a set of internal information technology architecture, wherein the set of internal information technology architecture is controlled internally by a service provider;

receiving, by one or more hardware computer processors, a set of exogenous information technology architecture, wherein the set of exogenous information technology architecture is not controlled by the service provider;

receiving, by one or more computer hardware processors, a set of service level agreement requirements, wherein the set of service level agreement requirements are a set of requirements agreed upon by the service provider and a service user;

receiving, by one or more hardware computer processors, a set of sensor data associated with weather from at least one sensor monitoring environmental weather conditions which affect the set of internal information technology architecture and the set of exogenous information technology architecture, wherein the set of sensor data consists of: a temperature; an atmospheric pressure; a precipitation amount; a type of precipitation; a humidity level; a wind speed; a noise level; and a seismic value;

receiving, by one or more hardware computer processors, a set of heuristic data relating to the set of internal information technology architecture and the set of exogenous information technology architecture;

determining, by one or more hardware computer processors, a risk metric based on the set of internal information technology architecture, the set of exogenous information technology architecture, the set of service level agreement requirements, the set of sensor data, and the set of heuristic data;

determining, by one or more hardware computer processors, a recommendation to transfer one or more services performed on the set of exogenous information technology architecture to the set of internal information technology architecture based on the determined risk metric; and transferring, by one or more hardware computer processors, the one or more services to the set of internal information technology architecture.

2. The method of claim 1, wherein the step of determining, by one or more hardware computer processors, a risk metric, comprises:
using a risk analytics function to determine the risk metric.

3. The method of claim 1, wherein the set of service level agreement requirements may include one or more of the following: a scope of work to be performed, a quality level of the scope of work to be performed, a list of responsibilities between the service provider and the service user, and a contracted delivery time.

4. The method of claim 1, wherein the set of heuristic data includes one or more of the following: a query response time; a first call resolution time; a turn-around time; a mean time to recover; a mean time to failure.

5. The method of claim 1, wherein the at least one recommendation includes a recommendation for at least one of the set of internal information technology architecture, the set of exogenous information technology architecture, or both the set of internal and the set of exogenous information technology architecture.

6. A computer program product for analyzing a risk of a service level agreement operating with exogenous architecture, the computer program product comprising:
one or more computer readable storage media; and
program instructions stored on the one or more computer readable storage media, the program instructions comprising:
program instructions to receive a set of internal information technology architecture, wherein the set of internal information technology architecture is controlled internally by a service provider;
program instructions to receive a set of exogenous information technology architecture, wherein the set of exogenous information technology architecture is not controlled by the service provider;
program instructions to receive a set of service level agreement requirements, wherein the set of service level agreement requirements are a set of requirements agreed upon by the service provider and a service user;
program instructions to receive, a set of sensor data associated with weather from at least one sensor monitoring environmental weather conditions which affect the set of internal information technology architecture and the set of exogenous information technology architecture, wherein the set of sensor data consists of: a temperature; an atmospheric pressure; a precipitation amount; a type of precipitation; a humidity level; a wind speed; a noise level; and a seismic value;
program instructions to receive a set of heuristic data relating to the set of internal information technology architecture and the set of exogenous information technology architecture;
program instructions to determine a risk metric based on the set of internal information technology architecture, the set of exogenous information technology architecture, the set of service level agreement requirements, the set of sensor data, and the set of heuristic data;
program instructions to determine a recommendation to transfer one or more services performed on the set of exogenous information technology architecture to the set of internal information technology architecture based on the determined risk metric; and
program instructions to transfer the one or more services to the set of internal information technology architecture.

7. The computer program product of claim 6, wherein the step of determining, by one or more hardware computer processors, a risk metric, comprises:
using a risk analytics function to determine the risk metric.

8. The computer program product of claim 6, wherein the set of service level agreement requirements may include one or more of the following: a scope of work to be performed, a quality level of the scope of work to be performed, a list of responsibilities between the service provider and the service user, and a contracted delivery time.

9. The computer program product of claim 6, wherein the set of heuristic data includes one or more of the following: a query response time; a first call resolution time; a turn-around time; a mean time to recover; a mean time to failure.

10. The computer program product of claim 6, wherein the at least one recommendation includes a recommendation for at least one of the set of internal information technology architecture, the set of exogenous information technology architecture, or both the set of internal and set of exogenous information technology architecture.

11. A computer system for analyzing a risk of a service level agreement operating with exogenous architecture, the computer system comprising:
- one or more computer processors;
- one or more computer readable storage media; and
- program instructions stored on the one or more computer readable storage media for execution by at least one of the one or more computer processors, the program instructions comprising:
  - program instructions to receive a set of internal information technology architecture, wherein the set of internal information technology architecture is controlled internally by a service provider;
  - program instructions to receive a set of exogenous information technology architecture, wherein the set of exogenous information technology architecture is not controlled by the service provider;
  - program instructions to receive a set of service level agreement requirements, wherein the set of service level agreement requirements are a set of requirements agreed upon by the service provider and a service user;
  - program instructions to receive, a set of sensor data associated with weather from at least one sensor monitoring environmental weather conditions which affect the set of internal information technology architecture and the set of exogenous information technology architecture, wherein the set of sensor data consists of: a temperature; an atmospheric pressure; a precipitation amount; a type of precipitation; a humidity level; a wind speed; a noise level; and a seismic value;
  - program instructions to receive a set of heuristic data relating to the set of internal information technology architecture and the set of exogenous information technology architecture;
  - program instructions to determine a risk metric based on the set of internal information technology architecture, the set of exogenous information technology architecture, the set of service level agreement requirements, the set of sensor data, and the set of heuristic data;
  - program instructions to determine a recommendation to transfer one or more services performed on the set of exogenous information technology architecture to the set of internal information technology architecture based on the determined risk metric; and
  - program instructions to transfer the one or more services to the set of internal information technology architecture.

12. The computer system of claim 11, wherein the step of determining, by one or more hardware computer processors, a risk metric, comprises:
- using a risk analytics function to determine the risk metric.

13. The computer system of claim 11, wherein the set of service level agreement requirements may include one or more of the following: a scope of work to be performed, a quality level of the scope of work to be performed, a list of responsibilities between the service provider and the service user, and a contracted delivery time.

14. The computer system of claim 11, wherein the set of heuristic data includes one or more of the following: a query response time; a first call resolution time; a turn-around time; a mean time to recover; a mean time to failure.

* * * * *